Sept. 14, 1948.  L. ZAIGER  2,449,357
WINDSHIELD WIPER
Filed Sept. 8, 1944  3 Sheets-Sheet 1
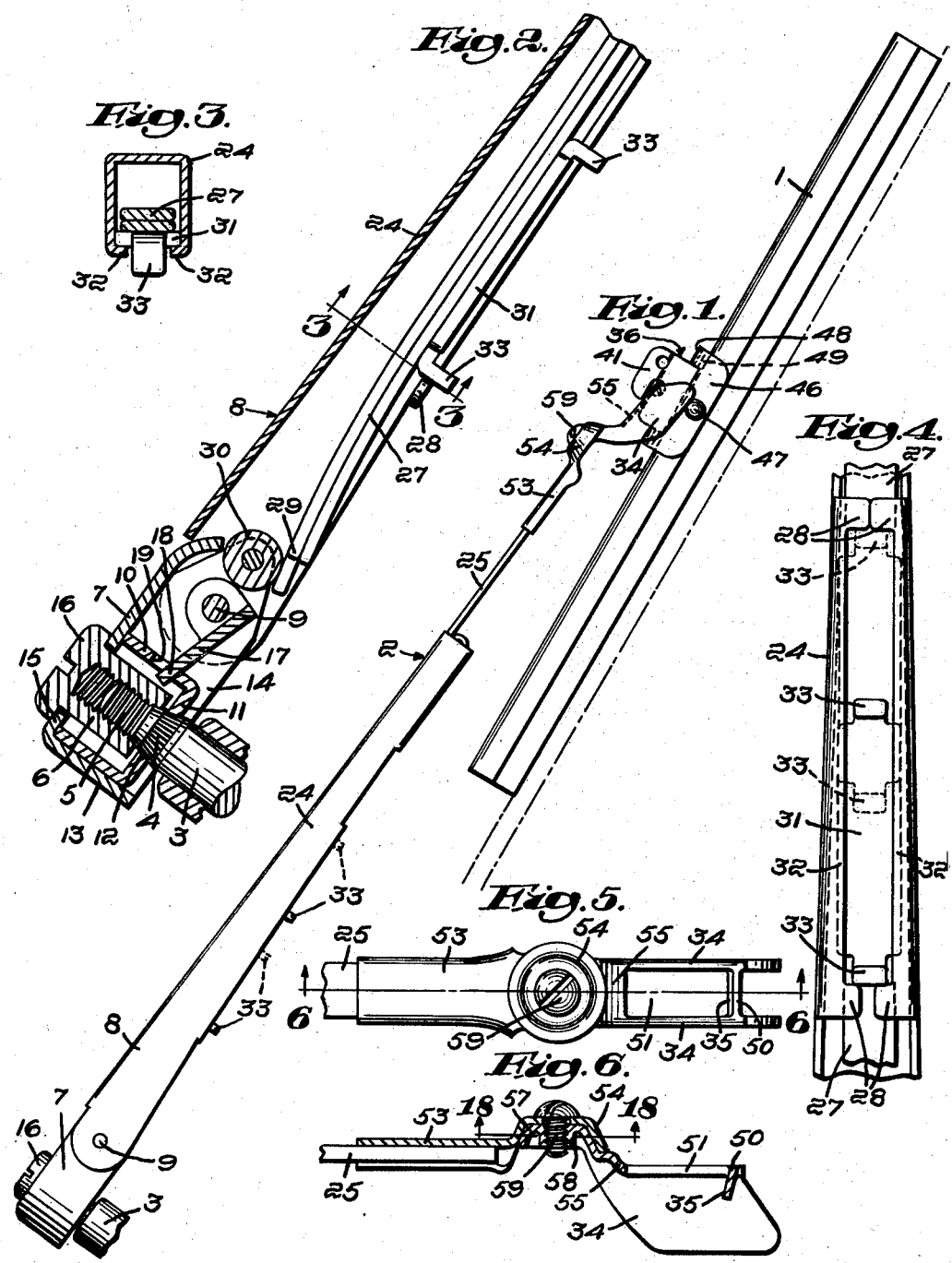
Inventor:
Louis Zaiger;
by Heard Smith & Tennant
Attorneys Sept. 14, 1948. L. ZAIGER 2,449,357
WINDSHIELD WIPER
Filed Sept. 8, 1944 3 Sheets-Sheet 2
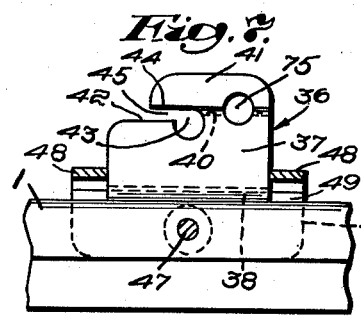
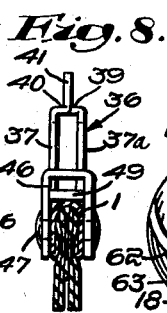
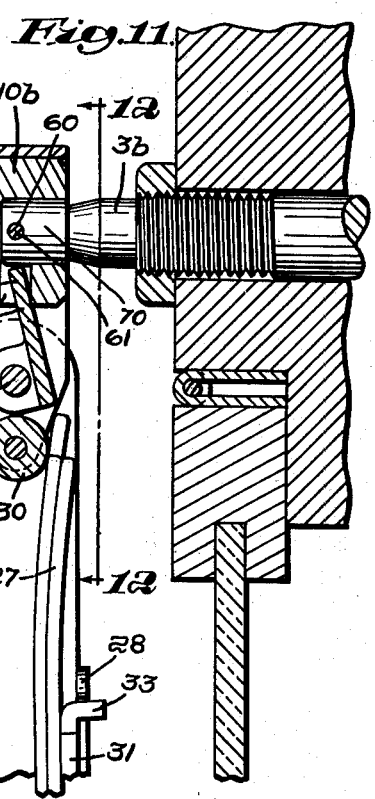
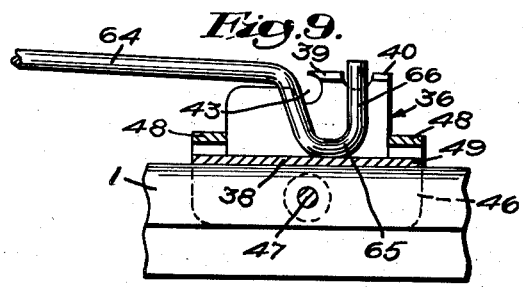
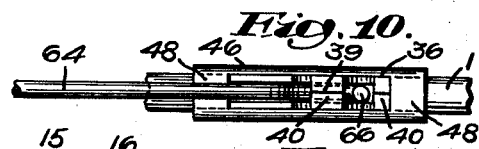
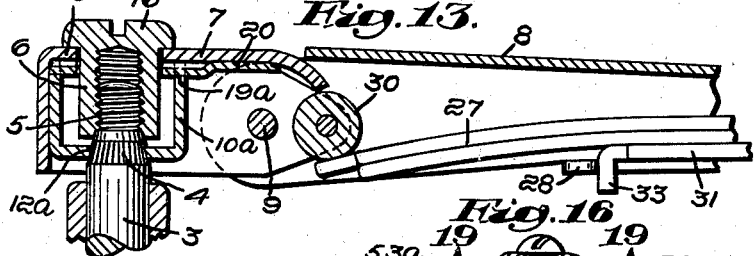
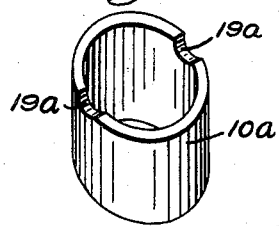
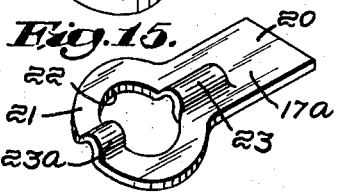
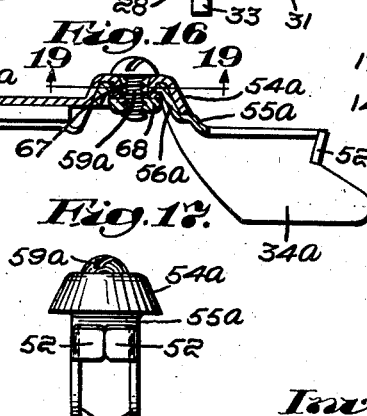
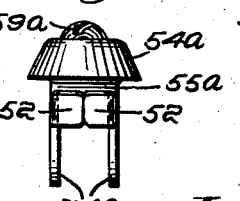
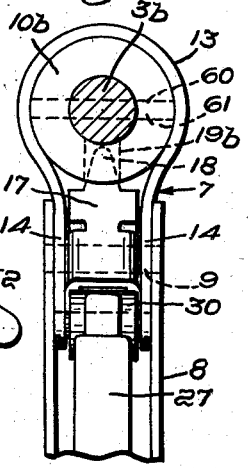
Inventor:
Louis Zaiger
By Heard Smith & Tennant
Attorneys Sept. 14, 1948.  L. ZAIGER  2,449,357
WINDSHIELD WIPER
Filed Sept. 8, 1944  3 Sheets-Sheet 3

Inventor:
Louis Zaiger,
by Heard Smith & Tennant
Attorneys

Patented Sept. 14, 1948

2,449,357

UNITED STATES PATENT OFFICE 2,449,357

WINDSHIELD WIPER

Louis Zaiger, Swampscott, Mass.

Application September 8, 1944, Serial No. 553,146

4 Claims. (Cl. 287—53)

This invention relates to windshield wipers and has for its objects to provide an improved means for attaching the wiper arm to the operating shaft.

In the drawings wherein I have illustrated some selected embodiments of the invention, Fig. 1 is a view of the windshield wiper embodying my invention, Fig. 2 is a fragmentary sectional view showing the manner of attaching the wiper blade to the operating shaft, Fig. 3 is a section on the line 3—3, Fig. 2, Fig. 4 is a fragmentary view of a portion of the wiper arm showing the means for adjusting the spring tension.

Fig. 5 is a plan view of the outer end portion of the wiper arm showing the means by which the wiper blade can be adjusted into angular positions.

Fig. 6 is a section on the line 6—6, Fig. 5.

Fig. 7 is a view partly in section showing my improved clip for attachment of the wiper blade to the wiper arm.

Fig. 8 is an end view of Fig. 1 with the wiper blade shown in section.

Fig. 9 is a view illustrating the manner in which the improved clip can be utilized to connect the blade to an arm having a hook at the end.

Fig. 10 is a top plan view of Fig. 9.

Fig. 11 is a fragmentary sectional view showing the manner in which my improved wiper arm may be attached to the type of operating shaft having a transverse opening designed to receive the bent end of a wire wiper arm.

Fig. 12 is a section on the line 12—12, Fig. 11.

Fig. 13 is a fragmentary sectional view illustrating a different embodiment of my invention.

Fig. 14 is a perspective view of the bushing element shown in Fig. 15.

Fig. 15 is a perspective view of the connector element shown in Fig. 13.

Fig. 16 is a sectional view showing a different embodiment of the invention.

Fig. 17 is an end view of Fig. 16 looking toward the left.

Figure 18:
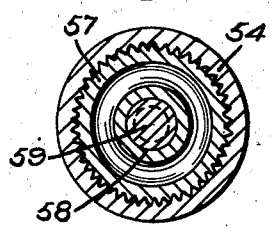
Fig. 18 is a section on the line 18—18, Fig. 6.
Figure 19:
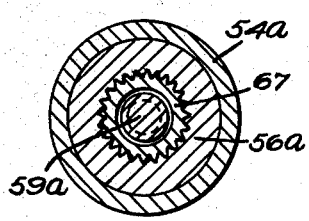
Fig. 19 is a section on the line 19—19, Fig. 16.
Figure 20:
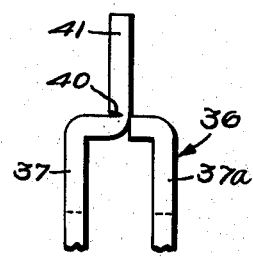
Fig. 20 is a plan view of the clip 36.

In the drawings 1 indicates the wiper blade which may have any suitable or usual construction. 2 indicates the wiper arm to the end of which the wiper blade is detachably connected, and 3 is the operating shaft to which the wiper arm is connected and by which said arm is given its vibrating movement. The operating shaft 3 shown in Figs. 2 and 13 is of the type now commonly used, and it is formed with a tapered shoulder 4 having a serrated surface and a screw-threaded end portion 5 to receive a clamping nut 6.

The wiper arm herein shown comprises the usual inner section 7 which has a channel shape, and an outer section 8 that is pivoted to the inner section as shown at 9.

One feature of my present invention relates to the means for mounting the wiper arm 2 on the operating shaft 3. Such means comprises a bushing member adapted to be clamped against the serrated shoulder 4, thereby locking the bushing to the shaft and a connector element having a portion received between the side walls of the channel inner section 7 and another portion engaging in a lateral aperture with which the bushing is provided.

In Fig. 2 the bushing is shown at 10, and it has a general cup shape, the bottom 11 thereof having an opening 12 to receive and engage the tapered shoulder 4 of the shaft 3. The wall of the opening 12 is serrated so that when the bushing is in operative position the wall of the opening will have a locking engagement with the tapered shoulder 4, thereby locking the bushing to the shaft.

The inner section 7 of the arm is formed at one end with a hood portion 13 (see Fig. 12) which loosely encircles the bushing 10, said inner section having a channel shape in cross section as above described, thereby presenting the two side walls 14. The hood portion 13 of the inner arm section 7 not only receives within it the bushing 10, but the top wall thereof overlies the top of the bushing as shown at 15. The clamping nut 6 is in the form of a cap nut which is adapted to be screw threaded to the screw-threaded end 5 of the shaft 3, said nut passing through an opening in the top wall 15 of the arm section 7 and having a head 16 which is clamped against said top wall 15 when the screw is tightened as clearly shown in Fig. 2. The bushing is thus firmly clamped to the operating shaft 3.

One form of connector element by which the bushing is connected to the wiper arm 2 for the purpose of transmitting vibrating movement thereto is shown in Figs. 2, 11, and 12. This comprises a member 17 which is pivotally mounted on the pivotal pin 9 by which the arm sections 7 and 8 are pivoted together, said connector element having a width to fit between the side walls 14 of the arm section 17 as best seen in Fig. 12. This connector element is also provided with an end portion 18 adapted to engage in a lateral opening 19 with which the bushing 10 is provided.

With this construction, any turning movement of the bushing 10 resulting from turning movement of the shaft 3 is transmitted to the inner arm section 7 and thereby to the wiper arm itself through the connector element 17.

The wiper arm can be readily removed from the shaft 3 by simply removing the clamping nut 6 and then withdrawing the arm and bushing from the shaft.

To replace the arm on the shaft, the bushing 10 is first assembled with the shaft with the lateral opennig 19 therein directed in the direction in which the arm is to assume and then the hooded portion 13 of the inner arm section 7 may be placed over the bushing, care being taken to enter the end 18 of the connector 17 into the lateral opening 19 during the operation of placing the hood portion 13 over the bushing. The clamping nut 6 is then applied to the screwthreaded end of the shaft 3 and screwed home, thereby clamping the bushing firmly against the shoulder 4 and causing it to be interlocked therewith. The pivotal mounting of the connector element 17 permits the end portion 18 thereof to be entered into the aperture 19 during the assembling operation.

In Figs. 13, 14, and 15 I have illustrated a different embodiment of the invention in which the lateral opening in the bushing is formed at one end thereof instead of between its ends. In this embodiment the bushing is indicated at 10a and it has a cup shape with an opening 12a in the bottom to fit against the tapered shoulder 4 of the shaft 3. The bushing is provided at its outer end with a lateral opening 19a which is formed in the end edge of the bushing and extends clear across the latter and thereby resolves itself into two notches 19a.

The connector for connecting the bushing to the arm section 7 is indicated at 17a and is shown best in Fig. 15. This connector has an end portion 20 which fits between the side walls 14 of the arm section 7, and it has an enlarged head 21 that fits within the hood portion 13 of said arm section. This head 21 has a central aperture 22 of a size to freely receive the clamping nut 6, and said connector is formed with ribs 23, 23a adapted to fit the notches 19a. In assembling with the shaft 3 a wiper arm having the bushing 10a and connector 17a, the bushing will first be placed over the end of the shaft 3 with the aperture 12a therein engaging the serrated shoulder 4 of the shaft 3 and with the notches 19a directed in the direction in which the wiper arm is to assume when it is attached to the shaft. A connector 20 is then placed on the end of the bushing with the ribs 23, 23a occupying the transverse notches 19a, and the wiper arm is then placed in position with the hood portion 13 encircling the bushing and with the two side flanges 14 of the inner arm section 7 straddling the portion 20 of the connector. When the clamping nut 6 is applied and screwed home, the bushing will be firmly clamped to the shaft 3, and the connector will be held in position with the ribs 23, 23a occupying the transverse notches 19a.

The outer section 8 of the wiper arm is made with the usual channel shape portion 24 and the extended portion 25 to the end of which the wiper blade 1 is attached. The wiper arm also embodies in its structure the usual spring means for yieldingly pressing the wiper blade against the windshield glass which is indicated by dotted lines 26 in Fig. 1. The spring element is indicated at 27, and it may comprise one or more leaf springs which are secured in position within the channel of the arm section 24 by tabs 28 integral with the side walls of said channel section 24 and which are bent over underneath the spring. The free end 29 of the spring bears against a roll 30 which is carried by the outer end of the inner arm section 7 as usual in windshield wiper arms.

I have provided herein means for varying the pressure of the spring 27 against the roll 30, and thereby varying the resilient action of the spring. For this purpose I have provided a fulcrum member 31 which is located beneath the spring 27 and is confined between the latter and inturned edges 32 of the side walls of the channel portion 24. This fulcrum member 31 can be moved longitudinally of the arm from the full line position shown in Figs. 2 and 4 to the dotted line position. This member 21 constitutes a fulcrum about which the spring 29 is flexed, and by shifting said member longitudinally of the arm, the fulcrum point or point of flexure is moved farther from or nearer to the roll 30, and thereby the resilient action of the spring is varied. The spring 27 will have a stiffer action when the fulcrum member is in the full line position, Fig. 2, than when the fulcrum member is in the dotted line position.

The fulcrum member is shown as formed with depending portions 33 which form finger pieces by which the said member may be shifted longitudinally of the wiper arm.

The extremity of the wiper arm to which the wiper blade is attached is formed with two spaced side walls or flanges 34 connected by a bridge or web portion 35. This web portion 35 cooperates with a clip element 36 which is attached to the back of the wiper blade 1 for detachably securing said wiper blade to the wiper arm.

The clip 36 is preferably made of sheet metal which is bent to present two side walls 37, 37a spaced from each other and connected at the lower end by a bridge portion 38. At one end of the clip (the outer end, that is, the end directed toward the outer end of the wiper arm) the upper edge of the side wall 37 is bent inwardly as shown at 40 and is then bent upwardly to form an upstanding fin portion 41. The outer end of the side wall 37a has its upper edge opposite the inturned portion 40 of the wall 37, and it is formed with a tab 39 that is bent inwardly and meets the inturned portion 40 of the side wall 37.

At the inner end of the clip (that is, the end of the clip directed toward the inner end of the wiper blade) the side walls are somewhat lower than at the outer end so that the upper edges 42 of the inner ends of said side walls are below the inturned portion 40 and the lower edge 44 of the fin 41. Each side wall of the clip is formed with a recess 43 which extends below the edge 42, and the outer wall of which is constituted by the end edges of those portions 39 and 40 of the side walls that are bent inwardly. The fin 41 extends over and beyond the recess 43 and the lower edge 44 thereof is spaced from the edge 42, thereby to provide an entering slot 45 to receive the web 35, as will be presently explained.

The clip 36 may be secured to the wiper blade 1 in any desired way. I have herein shown for this purpose a saddle member 46 which straddles the wiper blade and is rigidly secured thereto by means of a rivet 47.

This saddle member has a central opening to receive the clip, and the end portions 48 thereof overlie and embrace arms 49 extending from the ends of the clip. There is sufficient play between the arms 49 and the end portions 48 of the saddle member to provide for the desirable rocking motion of the wiper blade when it is in action.

The web portion 35 of the wiper arm has a width dimension, that is, a dimension from its lower edge to its upper edge which is greater than the width of the entering slot 45, and it has a thickness dimension such as to permit it to be entered edgewise into and through the slot 45. The recess 43 is large enough to accommodate the width dimension of the web 35.

Figure 24:
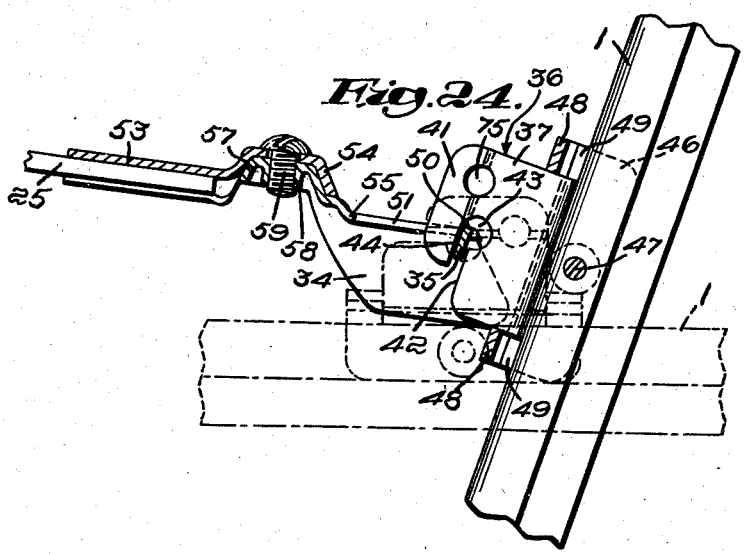
Fig. 24 is a view partially in cross section illustrating the method of assembling the construction.

In assembling the wiper blade with the wiper arm, the blade is held in an angular position relative to the wiper arm such as is shown in Fig. 24, and then the web 35 is entered edgewise into the slot 45 with the upper edge 50 thereof leading. When the web 35 has been brought into the recess 43, then the blade and arm are moved relative to each other into their operative positions during which movement the side walls or flanges 34 of the wiper arm move into a position straddling the inner end of the clip, with the open end of the slot 45 directed toward the inner end of said wiper arm. When in this position, the width dimension of the web 35 extends transversely to the slot 45 and the clip is thereby locked to the arm and cannot be detached therefrom except by turning the arm and the clip back into a position in which the width dimension of the web extends parallel to the slot 45. When the arm and blade are assembled the fin 41 occupies a position above the end of the arm and functions simply as a holddown element to prevent the web from being raised out of the recess 43.

The web 35 may be described as a "clip-engaging web" since it is the portion of the arm which engages the clip and holds the wiper blade in its proper relation to the arm. The clip-engaging web may be formed in various ways without departing from the invention. In the construction shown in Figs. 5 and 6, the end of the arm has a portion cut out to provide the relatively large opening 51, and in forming this opening, a portion of the metal to be removed may be bent downwardly to produce the web 35.

In the construction shown in Figs. 16 and 17 the end of the arm is provided with the side walls 34a corresponding to the side walls 34 in Figs. 5 and 6 which straddle the clip when the wiper blade is assembled therewith, and each side wall has a tab 52 extending therefrom which is bent inwardly to meet the corresponding tab of the other side wall and thereby form the clip-engaging web. I will preferably make this web so that it has a slightly angular relation as best seen in Figs. 6 and 16.

In the wiper arm illustrated the terminal portion thereof to which the wiper blade is attached is connected to the end of the arm in such a way as to permit said terminal portion to turn into different angular positions for the purpose of giving any desired angular position to the wiper blade. For this purpose the end of the extension portion 25 is provided with a fitting 53 which is provided with a cup-shaped hub portion 54. The terminal end portion of the arm to which the wiper blade is attached and which is indicated generally at 55 is provided with a complementary hub portion 57 which rests within the hub portion 54, said hub portions being connected by a clamping screw 59. In the construction shown in Figs. 5 and 6, the contacting faces of the nesting hub portions 54 and 57 are serrated, and the hub portion 57 is provided with a downturned annular flange 58 which is interiorly screw threaded to act as a nut for a clamping screw 59. When the clamping screw 59 is tightened the two cone-shaped contacting serrated surfaces of the nesting hub members 54, 57 are locked together by the interlocking engagement of the serrations thereon. If the screw 59 is loosened slightly, then the two hub portions may be separated sufficiently to disengage the serrations of the contacting faces, thus allowing the terminal portion 55 to be turned about the hub into any desired angular position. The tightening of the screw 59 will bring the contacting serrated surfaces of the nesting hubs again into interlocking relation, thus locking the terminal section 55 in its adjusted position.

In the construction shown in Fig. 16, the hub portion 54a of the fitting 53a is provided with a downturned annular flange 67 which extends through an opening formed in the hub portion 56a of the terminal end part 55a. The exterior surface of the downturned flange 67 is serrated as is also the wall of the opening through the hub portion 56a, thereby providing an interlocking engagement between said flange 67 and the wall of the opening. The two hub portions 54a and 56a are clamped together by a clamping screw 59a which extends axially through the two hub portions, said screw having a clamping nut 68 screw threaded thereto. When the clamping nut 68 is tightened, the hub 56a of the terminal part 55a will be positively locked to the hub 54a of the fitting 53a. By backing off the clamping nut 68 thereby loosening the clamping screw 59a, it will be possible to raise the flange 67 out of the opening in the hub portion 56a, and when this has been done the terminal section 56a may be turned into any desired angular position relative to the fitting, and the flange 67 may then be reentered into the opening. When the screw 59a is tightened, the two parts will be firmly locked together because of the interlocking serrated face of the flange 67 with the serrated wall of the opening in the hub member 56a.

My improved arm is adapted to be detachably applied not only to the more modern operating shaft 3 which is located below the windshield of the automobile, but is also adapted to be detachably mounted on what may be called an "old style" operating shaft that is situated at the top of the windshield and is formed with a transverse opening designed to receive the transversely bent end of a wire wiper arm. Such an operating shaft is shown at 3b in Fig. 11 and it is provided at its end with the transverse opening 60 which was designed to receive the laterally bent end of a wire wiper arm.

Figures 21, 22:
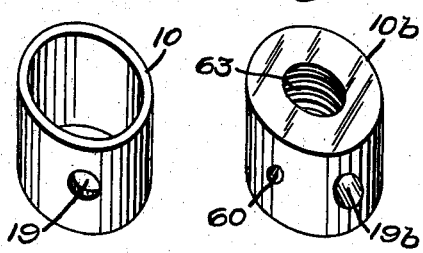
Fig. 21 is a perspective view of the bushing 10.
Fig. 22 is a perspective view of another form of bushing.

In mounting my improved wiper arm on an operating shaft of this type, I plan to use a bushing 10b such as shown in Figs. 11 and 12 and 22. This bushing has an axial opening therethrough of a size to fit the end 70 of the shaft 3b, the outer end of the opening being screw threaded as shown at 63. The bushing 10b has an exterior diameter of a size to fit freely within the hood portion 13 of the inner arm section 7. The bushing is also provided with a transversely extending opening 71 preferably of the same size as the opening 60, said opening 71 being in register with the opening 60 through the shaft when the bushing is applied to the shaft as shown in Fig. 12. A locking pin 61 is driven through the apertures 71 and 60, thereby locking the bushing 10b firmly on the operating shaft 3b.

This bushing 10b is also formed with another radial opening 19b which is adapted to receive the end 18 of the connecting member 17 of the arm, said opening 19b of Figs. 11 and 12 corresponding to the opening 19 of Fig 2. The bushing 10b has an axial dimension greater than the portion 70 of the operating shaft 3b so that the interiorly screw-threaded portion 63 of said bushing extends beyond the end of the shaft 3b. The wiper arm is retained on the shaft by a clamping screw 62 having a relatively short screw-threaded portion which enters the opening in the end wall of the hood 13 and has screw-threaded engagement with the interior screw threads of the bushing 10b. The retaining screw 62 holds the arm from movement lengthwise of the operating shaft, and the connecting member 17 constitutes the connection between the hub 10b, which is locked to the shaft, and the operating arm to transmit the turning movement of the shaft to the arm.

The clip 36 shown in Figs. 1, 7, and 8 is not only adapted to be used in connection with a wiper arm such as above described, but is also adapted to be used in connection with a wire wiper arm having a hook-shaped end such as the wiper arm 64 in Fig. 9 which is provided with a hook-shaped portion 65 having an upstanding end portion 66.

For this purpose the clip 36 is formed with a scoreline at the base of the fin 41 so that said fin may be readily broken off from the clip by grasping the same with a pair of pliers and bending it back and forth. When the fin 41 has thus been broken off, the clip will present the two spaced sides 37, and also the inturned portion 40 of one side 37 and the inwardly extending tab 39 which extends from the other side 37 and meets the inturned portion 40 and forms therewith a bridge portion.

The sides 37, of the clip are spaced apart a sufficient distance to receive between them the hook portion 65 of a wire wiper arm, and after the fin 41 has been broken off, this clip minus its fin may be attached to a wiper arm such as shown in Fig. 9 by inserting the hook 65 into the space between the sides 37, and beneath the bridge portion 39, 40. The clip is preferably provided with a transverse opening 75 which breaks through the inturned flange 40 immediately in the rear of the inturned tab 39. The gap in the inturned flange 40 formed by the aperture 75 provides room for the upper extremity 66 of the hook 65. The bridge portion 39, 40 is thus confined between the two sides of the hook portion 65 so that movement of the clip longitudinally of the arm 64 is prevented.

In this construction the necessary flop of the wiper blade as its direction of movement is reversed during the wiping operation is provided for by the relatively loose fit between the bridge portion 38 of the clip and the portions 48 of the saddle member.

In the construction shown in Fig. 2 the head 16 of the cap nut 6 prevents the wiper arm from moving outwardly axially of the shaft. In the construction shown in Fig. 11 the screw 62 is the element which holds the arm on the shaft and prevents its moving axially thereof.

Figure 23:
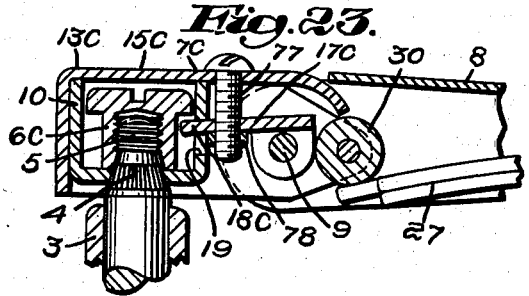
Fig. 23 is a detail chiefly in cross section of another embodiment of the invention.

In Fig. 23, I have shown a different embodiment of my invention wherein the wiper arm is prevented from movement axially of the shaft by means of a screw engaging the connector element by which the arm is connected to the bushing. In said Fig. 23 the operating shaft 3 having its tapered shoulder 4 and screw threaded portion 5 and the bushing 10 which is interlocked with the shoulder 4 and is provided with the lateral aperture 19 are similar in construction to the same parts shown in Fig. 2. In the embodiment shown in Fig. 23, however, the bushing 10 is held in its interlocking relation with the serrated shoulder 4 by means of a cap nut 6c which is located within the bushing 10, and the hood portion 13c of the inner wiper arm section 7c has a solid top wall 15c which conceals the nut 6c. In the construction shown in said Fig. 23 a connector element 17c similar to that shown in Figs. 2 and 12 is employed for connecting the wiper arm to the bushing, said connector element being pivoted on the pivot pin 9 and having an end portion 18c adapted to enter the lateral opening 19 in the bushing 10.

In this embodiment of the invention, the arm section 7c is held from outward movement axially of the shaft by a screw member 77 which extends through an opening in the top wall of the hood and through an opening in the connecting member 17c, said screw 77 having a nut 78 on its lower end. While the arm is being placed on the shaft, the nut 78 will be backed off to allow the connecting member 17c to have more or less free play. After the wiper arm has been placed in position as shown in Fig. 23, then the screw 77 is turned to tighten the nut 78, thereby clamping the end 18c of the connecting element against the upper wall of the opening 19 and also clamping the top wall of the arm section 7c against the top edge of the bushing 10.

I claim:

1. A windshield cleaner comprising an operating shaft, a bushing element interlocked therewith and provided with a lateral opening, a wiper arm presenting an inner channel section having a hood portion at its inner end to enclose said bushing, and a connecting member for connecting the inner channel section to the bushing, said connecting member having a portion thereof engaged in the lateral opening of the bushing and another portion located between the sides of said inner channel section.

2. A windshield cleaner comprising an operating shaft, a bushing element interlocked therewith and provided with a lateral opening, a wiper arm comprising an inner channel section having a hood portion at its inner end to enclose said bushing, and also having an outer blade-carrying section, a pivot pin pivotally connecting said arm sections, and a connecting member pivotally mounted on said pin and having an end portion to engage in the lateral opening of the bushing.

3. A windshield cleaner comprising an operating shaft having a screw-threaded end portion, a bushing element interlocked with said shaft and provided with a lateral opening, a wiper arm including an inner channel section having a hood portion at its inner end to enclose said bushing, a connecting member for connecting the inner channel section of the arm to the bushing, said connecting member having a portion engaged in the lateral opening of the bushing and another portion located between the sides of said channel section, and a clamping nut screw threaded to the end of the shaft and preventing removal of the inner arm section therefrom.

4. Means for connecting a windshield wiper arm having an inner channel section provided with a hood portion to an operating shaft, said means comprising a bushing element interlocked with said shaft and provided with a lateral opening and enclosed within said hood portion, a connecting member located between the sides of said inner channel arm section and having a portion engaged in the lateral opening of the bushing, and means for retaining said connecting member in such position, whereby the turning movement of the bushing is communicated to the connecting member and thus to the wiper arm through the portion of the connecting member which is engaged in said lateral opening.

LOUIS ZAIGER.

REFERENCES CITED

The following references are of record in the file of this patent:

UNITED STATES PATENTS

| Number | Name | Date |
| --- | --- | --- |
| 1,661,873 | Buxbaum | Mar. 6, 1928 |
| 1,697,710 | Bostroem | Jan. 1, 1929 |
| 2,003,844 | Tintner | June 4, 1935 |
| 2,156,506 | Marcolivio | May 2, 1939 |
| 2,286,035 | Horton et al. | June 9, 1942 |
| 2,312,278 | Zaiger | Feb. 23, 1943 |
| 2,357,280 | Smulski | Aug. 29, 1944 |